United States Patent
Tupe et al.

(10) Patent No.: US 11,572,461 B2
(45) Date of Patent: Feb. 7, 2023

(54) MULTIMODAL COPOLYMER OF ETHYLENE AND AT LEAST TWO ALPHA-OLEFIN COMONOMERS AND FINAL ARTICLES MADE THEREOF

(71) Applicant: BOREALIS AG, Vienna (AT)

(72) Inventors: Ravindra Tupe, Helsinki (FI); John Jamieson, Porvoo (FI); Jarmo Kela, Porvoo (FI); Alexandra Romina Albunia, Linz (AT); Ricardo Godoy-Lopez, Linz (AT); Markku Vahteri, Porvoo (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/579,377

(22) PCT Filed: May 30, 2016

(86) PCT No.: PCT/EP2016/062128
§ 371 (c)(1),
(2) Date: Dec. 4, 2017

(87) PCT Pub. No.: WO2016/198273
PCT Pub. Date: Dec. 15, 2016

(65) Prior Publication Data
US 2018/0079899 A1    Mar. 22, 2018

(30) Foreign Application Priority Data
Jun. 10, 2015 (EP) ..................... 15171420

(51) Int. Cl.
*C08L 23/08* (2006.01)
*C08J 5/18* (2006.01)
(Continued)

(52) U.S. Cl.
CPC .......... *C08L 23/0815* (2013.01); *B32B 27/08* (2013.01); *B32B 27/32* (2013.01);
(Continued)

(58) Field of Classification Search
CPC .............. C08F 210/16; C08F 2500/05; C08F 2500/06; C08L 23/0815; C08L 2205/025; C08J 5/18
See application file for complete search history.

(56) References Cited

U.S. PATENT DOCUMENTS 3,242,150 A    3/1966 Scoggin
3,324,093 A    6/1967 Alleman
(Continued)

FOREIGN PATENT DOCUMENTS

EP    479186    4/1992
EP    688794    12/1995
(Continued)

OTHER PUBLICATIONS

International Search Report and Written Opinion for PCT/EP2016/062128 dated Jul. 25, 2016.
(Continued)

*Primary Examiner* — Maria V Ewald
*Assistant Examiner* — Ethan Weydemeyer
(74) *Attorney, Agent, or Firm* — Thomas Horstemeyer, LLP (57) ABSTRACT

The present invention is directed to a multimodal polyethylene copolymer comprising a first and a second copolymer of ethylene and at least two alpha-olefin comonomers. Such multimodal copolymers are highly suitable for conversion processes that require a high Draw Down Ratio, like the production of thin films. Such multimodal polyethylene copolymers provide a good impact strength in the sense of a high Dart drop impact strength (DDI) and good isotropy of (Continued)

the films produces thereof. The invention further presents final articles such as films made therefrom.

4 Claims, 2 Drawing Sheets

(51) Int. Cl.
  *C08F 210/16* (2006.01)
  *B32B 27/32* (2006.01)
  *B32B 27/08* (2006.01)
  *C08F 2/00* (2006.01)

(52) U.S. Cl.
  CPC .......... *B32B 27/327* (2013.01); *C08F 210/16* (2013.01); *C08J 5/18* (2013.01); *B32B 2250/242* (2013.01); *B32B 2270/00* (2013.01); *B32B 2307/54* (2013.01); *B32B 2307/558* (2013.01); *B32B 2307/5825* (2013.01); *B32B 2307/708* (2013.01); *B32B 2307/732* (2013.01); *B32B 2439/46* (2013.01); *B32B 2439/70* (2013.01); *B32B 2553/00* (2013.01); *C08F 2/001* (2013.01); *C08F 2500/05* (2013.01); *C08F 2500/26* (2013.01); *C08J 2323/08* (2013.01); *C08L 2203/16* (2013.01); *C08L 2205/025* (2013.01)

(56) References Cited

U.S. PATENT DOCUMENTS

| | | | |
|---|---|---|---|
| 3,374,211 A | 3/1968 | Marwil et al. | |
| 3,405,109 A | 10/1968 | Rohlfing | |
| 4,582,816 A | 4/1986 | Miro | |
| 5,391,654 A | 2/1995 | Ahvenainen et al. | |
| 2009/0226729 A1 | 9/2009 | Niimoto et al. | |
| 2010/0009156 A1* | 1/2010 | Daviknes | B32B 27/308 428/220 |
| 2012/0123013 A1* | 5/2012 | Ek | C08L 23/0815 522/161 |

FOREIGN PATENT DOCUMENTS

| | | |
|---|---|---|
| EP | 0691367 | 1/1996 |
| EP | 773258 | 5/1997 |
| EP | 810235 | 12/1997 |
| EP | 1081205 | 3/2001 |
| EP | 1310295 | 5/2003 |
| EP | 1333044 | 8/2003 |
| EP | 1591460 | 4/2004 |
| EP | 1415999 | 5/2004 |
| EP | 891990 | 9/2004 |
| EP | 1739110 | 1/2007 |
| EP | 1788048 | 5/2007 |
| EP | 1941999 | 7/2008 |
| EP | 2067799 | 6/2009 |
| EP | 2186833 | 5/2010 |
| EP | 2883885 | 6/2015 |
| EP | 2883887 | 6/2015 |
| JP | H03232574 | 10/1991 |
| JP | 2005015572 | 1/2005 |
| JP | 5913762 | 4/2016 |
| WO | 1996019503 | 6/1996 |
| WO | 1996032420 | 10/1996 |
| WO | 1997050093 | 12/1997 |
| WO | 1999051646 | 10/1999 |
| WO | 2001055230 | 8/2001 |
| WO | 2003106510 | 12/2003 |
| WO | 2005118655 | 12/2005 |
| WO | 2006036702 | 4/2006 |
| WO | 2006066952 | 6/2006 |
| WO | 2007025640 | 3/2007 |
| WO | 2009071323 | 6/2009 |

OTHER PUBLICATIONS

Protective Coatings Fundamentals of Chemistry and Composition, Clive H. Hare, pp. 194-195, 1994.
The Chemistry and Physics of Coatings, 2nd ed., pp. 323 and 337, 2004.

* cited by examiner

Figure 1: Impact behaviour (DDI) vs Draw Down ratio (DDR)

Figure 2: Dart Drop Impact vs relative Isotropy

Figure 3: Relative Isotropy vs. draw down ratio (DDR)

MULTIMODAL COPOLYMER OF ETHYLENE AND AT LEAST TWO ALPHA-OLEFIN COMONOMERS AND FINAL ARTICLES MADE THEREOF

FIELD OF THE INVENTION

The present invention is directed to a multimodal polyethylene copolymer comprising a first and a second copolymer of ethylene and at least two alpha-olefin comonomers, highly suitable for conversion processes, that require a high Draw Down Ratio, such as the production of thin films, providing high impact strength in the sense of high Dart drop impact strength (DDI) The invention further presents final articles such as films made therefrom.

BACKGROUND INFORMATION

Producing multimodal polyethylene copolymers and films thereof is well known in the art. There are several various settings how to produce polyethylene grades having different density ranges, specific viscosities or comonomer compositions. Same applies for producing films comprising multimodal polyethylene copolymers. Such films are widely produced based on very different LLDPEs and used in various applications.

DESCRIPTION OF THE PRIOR ART

It is known to produce ethylene copolymers suitable for producing films by copolymerizing ethylene in two polymerization stages, for instance from EP-A-691367 which discloses bimodal ethylene copolymers produced in two fluidized bed reactors. The document does not disclose a third polymerization stage.

Also EP-A-773258 discloses blends of bimodal LLDPE resins with unimodal LLDPE. The bimodal LLDPE preferably has a density of from 0.91 to 0.930 g/cm$^3$, an HLMI of 45 to 145 g/10 min and melt flow ratio HLMI/MI of 50 to 150 (p. 5, lines 38-42). The example discloses a density of 0.921 g/cm$^3$, HLMI of 122 g/10 min and HLMI/MI of 99.

WO-A-97/50093 discloses bimodal LLDPE resins suitable for cable insulation. In examples it discloses a Copolymer E which was reported to be a bimodal LLDPE having a density of 0.913 g/cm$^3$, MI of 0.6 g/10 min and HLMI of 50 g/10 min. The document is silent as to the manufacturing method.

EP-A-2067799 discloses multimodal LLDPE resins which have been produced in two polymerization stages in a loop and a gas phase reactor in the presence of a ligand-modified catalyst.

EP-A-2186833 discloses a three-stage polymerization in a cascaded reactor sequence of two loop reactors followed by a gas phase reactor. In the first stage a polymer having an MFR$_2$ of preferably 200 to 1000 g/10 min and a density of preferably 945 to 978 kg/m$^3$ was produced.

The polymer produced in the second stage had an MFR$_2$ of preferably 200 to 1000 g/10 min and a density of preferably 945 to 978 kg/m$^3$. The final polymer had an MFR$_{21}$ of preferably 5 to 30 g/10 min and a density of preferably 940 to 970 kg/m$^3$. The polymers produced in the first and second stages had the same MFR$_2$. In the exemplified process the polymers produced in the first two stages were homopolymers and the final resins had MFR$_5$ of from 0.2 to 0.4 g/10 min and density of about 955 kg/m$^3$. The final polymer comprised only one alpha-olefin comonomer.

WO2009/071323 describes a multimodal linear low density polyethylene polymer having a final density of 900 to 940 kg/m$^3$, and containing at least one a-olefin comonomer in addition to ethylene comprising: (A) less than 41 wt. % of a lower molecular weight component being an ethylene homopolymer or a copolymer of ethylene and at least one a-olefin; and (B) more than 59 wt. % of a higher molecular weight component being a copolymer of ethylene and at least one a-olefin having a density in the range 902 to 912 kg/m$^3$; and wherein components (A) and (B) are obtainable using a Ziegler-Natta catalyst.

The densities of the higher molecular weight component are however too high to achieve demanding impact values.

WO2006037602A1 discloses multilayer films including a core multimodal layer prepared with Borstar process and having a homopolymer low molecular weight fraction and a 1-hexene high molecular weight copolymer fraction. The HMW copolymer fraction has density lower than 915 kg/m$^3$ and MFR$_2$ lower than 1 g/10 min.

WO2006/066952 describes a multimodal copolymer of ethylene comprising at least (i) a lower molecular weight fraction of a copolymer of ethylene and at least one alpha-olefin comonomer and (ii) a higher molecular weight fraction of a copolymer of ethylene and at least one alpha-olefin comonomer, wherein said copolymer has a density below 920 kg/m$^3$.

The material has a narrow molecular weight distribution and hence a lower FRR 21/2, which can lead to difficulties in the extrusion process, leading to e.g. big number of gels and hence bad optical appearance of the films.

EP 2883885 A and EP 2883887 A disclose a method of making multimodal ethylene polymers where the method comprises polymerizing ethylene in three polymerization stages. In both cases the impact properties of the films produced, i.e. DDI is reported to be <400 g when tested on 40 μm-films.

Still there is a constant need to further improve mechanical properties of the polymers and films produced thereof, and to provide polymers, that can be used to manufacture thin or thinner films, which still have the same mechanical properties as thick or thicker films.

It is therefore a need to find products which can be reliably converted into thin films, e.g. 20 μm films, and still provide good mechanical properties, especially high impact strength, like i.e. high DDI$_{20}$, good isotropic behaviour in machine and transversal direction and good processability.

Further it is a constant desire of film converters to have materials at hand that can be converted within broad processing windows, e.g. over a broad range of various Draw Down Ratios.

It is well known that the production of thin films poses more challenges both on the polymer and processing methods as it may require more stretching to sufficiently draw down the melt to the required (lower) thickness.

It is further well known in the art that mechanical properties, especially Impact behaviour of polyethylene films, are highly dependent on extrusion conditions and the intensity of the stretching applied on the film after having left the die head.

The intensity of the stretching can be defined via the Draw Down Ratio (DDR) or via the Take Up Ratio (TUR).

Draw Down ratio (DDR) can be defined as follows in Equation 1:

$$DDR = \frac{Diegap}{Filmthickness \cdot BUR}$$ Equation 1

In Equation 1 the film thickness relates to the final thickness of the film.

BUR stands for Blow up Ratio and is defined as ratio between Diameter of the bubble and the Diameter of the Die.

It is common understanding that the BUR defines the transversal orientation of the final film.

The Take Up ratio (TUR) can be defined as follows in Equation 2:

$$TUR = \frac{V_f}{V_0}$$ Equation 2

In

Equation 2 the terms are to be understood as follows:
$V_f$=Velocity of the melt at the die and
$V_0$=Take up speed of the final film at the nip rolls.

It is common understanding that the TUR defines the orientation in machine direction of the final film.

It is well known in the art that impact properties decrease with the level of stretching.

It is further known, that a high level of stretching leads to anisotropic films and hence to unbalanced tear behaviour, which can be expressed by a low relative isotropy.

Relative Isotropy expresses the balanced tear resistance properties in machine and transversal direction.

Relative Isotropy [%] is calculated by

100*(MD tear/TD tear)

So it is desired to have materials at hand, that can be converted into films at a higher draw down ratio (DDR) and still provide good mechanical properties, especially in the sense of impact and (relative) isotropic behaviour.

Alternatively it is required to provide polymers that can be converted into films which have better mechanical properties when produced at a given (high) draw down ratio (DDR) and still provide high impact behaviour and high relative isotropy.

Alternatively it is required to provide polymers that show a good drawability, such as good processability at high draw down ratios (DDR) during film forming processes.

It is further well known in the art that mechanical properties, especially Impact behaviour of polyethylene films are also highly dependent on the polymer structure of the material, especially the MWD (molecular weight distribution).

Polymers having a broad MWD or a distinct amount of high molecular weight fraction are of clear advantage for the production of films and their final properties as the broad MWD or the distinct amount of high molecular weight fraction positively contributes to better impact behaviour and better processability.

Still, the presence of such a pronounced high molecular weight fraction increases the sensitivity of the films in view of anisotropy. Hence, it is known within the processing industry, that products with a pronounced high molecular weight fraction should be processed with lower draw down ratio (DDR) to provide similar mechanical properties as films without such high molecular weight fraction.

Again, it is required to provide polymers that have good drawability and hence can be converted into films which have better mechanical properties when produced at a given (high or higher) draw down ratio and still provide high impact behaviour and high relative isotropy.

Surprisingly the present inventors have now identified a multimodal polyethylene copolymer, which provides a broad MWD and can be converted into thin films, which show much better processability and better mechanical properties in the sense of DDI, tear resistance and isotropy.

OBJECT OF THE INVENTION

So the present inventors have sought for solutions, how to provide multimodal polyethylene copolymers, which can be easily processed at a high throughput and converted into thin films having good mechanical properties, especially good impact properties, expressed by a $DDI_{20}$ of 400 g or more when measured on a 20 µm-film.

The present inventors have also sought for solutions how to provide multimodal polyethylene copolymers, which can be easily processed at a high throughput and converted into thin films having good mechanical properties, especially good tear behaviour and balanced (i.e. isotropic) tear properties in machine and transversal direction.

Main requirement of polymers used for producing thin films is a good down gauging behaviour. Down gauging films to low thicknesses (e.g. 35 µm or below) requires that the polymer shows a crystallisation behaviour, that minimizes orientation during later processing. This goes in hand with a low density fraction comprised by the multi- or bimodal polyethylene composition.

So it is desirable to provide multi- or bimodal polyethylene compositions that comprise a high molecular weight fraction having low density.

By multimodal or bimodal ethylene copolymer is meant a copolymer which contains distinct components having different average molecular weights, different contents of comonomer or both.

The multimodal copolymer of the present invention is produced by copolymerizing ethylene and at least two comonomers in two or more polymerization stages where the polymerization conditions are sufficiently different to allow production of different polymers in different stages.

It is further known to the art skilled person that the density of the high molecular weight fraction of a multi- or bimodal polyethylene composition is steered by the amount of comonomer dosed. So higher amounts of comonomer lead to lower densities.

With the known polymerization settings it is well possible to achieve low GPR-densities in the range of 900 kg/m³ or lower by running the polymerization conditions with high amounts of comonomer like 1-hexene and low or even zero amounts of hydrogen.

However, such polymerization settings up to now led to uncontrolled increase of the polymer MFR in the GPR and were hence not satisfying in view of impact behaviour of the final polymer.

Surprisingly the present inventors have now identified a multimodal ethylene copolymer characterized by comprising a high-molecular-weight fraction having a density of below 900 kg/m³ that provides an $DDI_{20}$ of 400 g or more when being converted into films So in the first embodiment the present invention encompasses a multimodal copolymer of ethylene and at least two alpha-olefin-comonomers characterized by having
- a) a density of from 906 to 925 kg/m³ determined according to ISO 1183,
- b) an $MFR_{21}$ of 10-200 g/10 min determined according to ISO 1133, wherein the multimodal copolymer of ethylene comprises
- c) a first copolymer of ethylene
  - i) comprising a first alpha-olefin comonomer having 4 to 10 carbon atoms and
  - ii) being characterised by comprising at least a first and a second fraction of the first copolymer of ethylene and the first alpha-olefin comonomer and
- d) a second copolymer of ethylene
  - i) comprising a second alpha-olefin comonomer having 6 to 10 carbon atoms, and
  - ii) having a density of below 900 kg/m³ when calculated according to Equation 5, based on values determined according to ISO 1183.

In another special embodiment the invention describes articles such as films, comprising the multimodal copolymer of ethylene and at least two alpha-olefin monomers.

In a further special embodiment the invention describes the use of the multimodal copolymer of ethylene and at least two alpha-olefin monomers in films or packaging applications.

BRIEF DESCRIPTION OF THE DRAWINGS:

FIG. 1 also shows that much higher draw down ratio (DDR) can be applied, still resulting in films with good mechanical properties, especially DDI. This further indicates that processability and drawability of the polymer are clearly improved.

FIG. 3 also shows that much higher DDR can be applied, still resulting in films with good mechanical properties, especially isotropy. This further indicates that processability and draw ability of the polymer are clearly improved.

DETAILED DESCRIPTION

The present invention will now be described in further detail by the examples provided below:

The following definitions are herewith introduced:

As "first copolymer" is defined as the polymer produced in the first polymerization step (preferably the loop reactor). This first copolymer may comprise two or more fractions of the first copolymer. Within the meaning of the patent it is understood, that each such fraction of the first copolymer is produced in one set of reaction conditions in one reaction stage or in one polymerization reactor. The fractions are further denominated as "first fraction of the first copolymer", "second fraction of the first copolymer", etc.

A "first copolymer mixture" is defined as sum of all polymer fractions produced up and including the polymer produced in the first polymerization step, i.e. prepolymerization, any first or second fraction of the first copolymer.

Similar a "second copolymer" is defined as the polymer produced in the second polymerization step, differing from the first polymerization step, preferably done in the gas-phase-reactor. Similar, a "second copolymer mixture" is defined as sum of all polymer fractions produced up and including the polymer produced in the second polymerization step, i.e. prepolymerization, any first or second fraction of the first copolymer and the second copolymer.

The multimodal ethylene copolymer is a copolymer of ethylene and at least two alpha-olefin comonomers, whereby the multimodal ethylene copolymer comprises a first copolymer of ethylene and an alpha-olefin comonomer having from 4 to 10 carbon atoms and a second copolymer of ethylene and an alpha-olefin comonomer having from 6 to 10 carbon atoms.

Preferably the multimodal ethylene copolymer is a copolymer of ethylene and at least two comonomers selected from 1-butene, 1-hexene, 1-octene It is further preferred that the multimodal ethylene copolymer is a copolymer of ethylene and exactly two comonomers selected from 1-butene, 1-hexene, or 1-octene. Especially preferred is a multimodal ethylene copolymer comprising
  a first copolymer of ethylene comprising ethylene and 1-butene, and
  a second copolymer comprising ethylene and 1-hexene.

Even more preferred is a multimodal ethylene copolymer comprising
  a first copolymer consisting of ethylene and 1-butene and
  a second copolymer of ethylene consisting of ethylene and 1-hexene.

The multimodal ethylene copolymer has a final density ρ of from 906 to 925 kg/m³, preferably 910 to 925 kg/m³ and more preferably from 913 to 923 kg/m³. The resins having densities lower than 906 kg/m³ tend to be so sticky that their production becomes problematic in a particle forming process. On the other hand, the resins having a final density of more than 925 kg/m³ do not have the required balance of properties required in the end use applications for the multimodal ethylene copolymer, such as they are not sufficiently soft and they may have a too low dart drop strength and tear strength.

The multimodal ethylene copolymer has a melt flow rate $MFR_{21}$ of 10-200 g/10 min, preferably from 20-150 g/10 min, like 25-100 g/min, such as 28-80 g/10 min. The resins having an $MFR_{21}$ of less than 10 g/10 min tend to have too high melt viscosity so that the throughput in a converting process may become restricted.

On the other hand, the resins having $MFR_{21}$ of more than 200 g/10 min have a too low melt strength for the end use applications. In addition, the combination of a high melt index with a low density of the resin often causes the resin particles to be sticky and this causes problems in a particle forming process, such as plugging and fouling of process equipment.

In addition, the multimodal ethylene copolymer can have a flow rate ratio $FRR_{21/5}$ of at least 15 or more, such as 20 or 23 or more.

Furthermore, it can have a flow rate ratio $FRR_{21/5}$ in the range of 15-40, preferably in the range of 20-35.

The copolymer of the present invention is a multimodal copolymer of ethylene and at least two alpha-olefin-comonomers having from 4-10 carbon atoms.

By multimodal ethylene copolymer is meant a copolymer which contains distinct components having different average molecular weights, different contents of comonomer or both.

The multimodal copolymer of the present invention is produced by copolymerizing ethylene and at least two comonomers in two or more polymerization stages where the polymerization conditions are sufficiently different to allow production of different polymers in different stages.

Alternatively, the multimodal copolymer may be produced in a single polymerization stage by using two or more different catalysts or by using a multicomponent catalyst comprising compounds of at least two different transition metals.

First Copolymer

The first copolymer of ethylene comprises ethylene and a first alpha-olefin comonomer having 4 to 10 carbon atoms, such as 1-butene, 1-hexene or 1-octene, more preferably 1-butene.

In a preferred embodiment the first copolymer consists of ethylene and 1-butene.

The first copolymer of ethylene has a melt flow rate $MFR_2$ of from 150-1500 g/10 min, like 150 to 1000 g/10 min, preferably from 150 to 750 g/10 min and more preferably from 200 to 600 g/10 min. Furthermore, the first copolymer has a density of from 945 to 955 kg/m$^3$, preferably from 945 to 953 kg/m$^3$ and most preferably from 948 to 953 kg/m$^3$.

It is further known that high densities in the low molecular weight fraction lead to higher stiffness of the final polyethylene composition. This goes in hand with drawbacks in impact, especially DDI-performance.

It is acknowledged among experts, that the impact behaviour (especially the DDI performance) can be improved by lowering the density of the high-molecular weight fraction.

Still, when loop densities are too high, the density of the GPR has to be very low to achieve the desired final density, which can cause problems in plant operability.

So care has to be taken to choose a density range that both gives good impact behaviour but does not cause operability problems during polymerization due to stickiness.

So, the present inventors have found a way, to provide a multimodal copolymer of ethylene that provides good impact properties even with higher densities of the first copolymer.

The first copolymer of ethylene is ideally produced in a first polymerization stage which is preferably a slurry polymerization.

The slurry polymerization usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 1 to about 50% by mole, preferably from about 2 to about 20% by mole and in particular from about 2 to about 10% by mole. The benefit of having a high ethylene concentration is that the productivity of the catalyst is increased but the drawback is that more ethylene then needs to be recycled than if the concentration was lower.

The temperature in the first polymerization stage is typically from 60 to 100° C., preferably from 70 to 90° C. An excessively high temperature should be avoided to prevent partial dissolution of the polymer into the diluent and the fouling of the reactor. The pressure is from 1 to 150 bar, preferably from 40 to 80 bar.

The slurry polymerization may be conducted in any known reactor used for slurry polymerization. Such reactors include a continuous stirred tank reactor and a loop reactor. It is especially preferred to conduct the polymerization in a loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654. It is thus preferred to conduct the first polymerization stage as a slurry polymerization in one or more loop reactors, more preferably in two consecutive loop reactors.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerization stage continuously.

Hydrogen is introduced into the first polymerization stage for controlling the $MFR_2$ of the first copolymer. The amount of hydrogen needed to reach the desired MFR depends on the catalyst used and the polymerization conditions. The desired polymer properties have been obtained in slurry polymerization in a loop reactor with the molar ratio of hydrogen to ethylene of from 100 to 1000 mol/kmol (or mol/1000 mol) and preferably of from 200 to 800 mol/kmol.

The first alpha-olefin comonomer is introduced into the first polymerization stage for controlling the density of the first copolymer. As discussed above, the comonomer is an alpha-olefin having from 4 to 10 carbon atoms, preferably 1-butene, 1-hexene or 1-octene, more preferably 1-butene. The amount of comonomer needed to reach the desired density depends on the comonomer type, the catalyst used and the polymerization conditions. The desired polymer properties have been obtained with 1-butene as the comonomer in slurry polymerization in a loop reactor with the molar ratio of comonomer to ethylene of from 100 to 1000 mol/kmol (or mol/1000 mol) and preferably of from 200 to 800 mol/kmol.

The average residence time in the first polymerization stage is typically from 20 to 120 minutes, preferably from 30 to 80 minutes. As it is well known in the art the average residence time τ can be calculated from:

Residence Time $\qquad$ Equation 3

$$\tau = \frac{V_R}{Q_o}$$

Where $V_R$ is the volume of the reaction space (in case of a loop reactor, the volume of the reactor, in case of the fluidized bed reactor, the volume of the fluidized bed) and $Q_o$ is the volumetric flow rate of the product stream (including the polymer product and the fluid reaction mixture).

The production rate in the first polymerization stage is suitably controlled with the catalyst feed rate. It is also possible to influence the production rate by suitable selection of the monomer concentration in the first polymerization stage. The desired monomer concentration can then be achieved by suitably adjusting the ethylene feed rate into the first polymerization stage.

According to the present invention, it is beneficial that the particles of the first copolymer of ethylene and the first alpha-olefin comonomer have a narrow distribution for the residence time This is seen to pose advantages in view of the homogeneity of the particles, namely in view of a more homogenous catalyst activity when producing the second copolymer in the subsequent gas-phase-reactor, leading to a more even distribution of the gas-phase-reactor-fraction in/around these particles and a lower amount of easily extractable low-molecular-weight fractions.

Without being bound to any theory inventors believe, that a certain minimum residence time in the first polymerization steps influences the catalyst activity in the sense, that densities can be better controlled in the subsequent gas-phase-reactor.

So the present inventors have identified a way to create a more homogenous polymer fraction of the first copolymer of ethylene and the first alpha-olefin comonomer by splitting the production process and producing the first copolymer in two consecutive polymerization stages. The polymer produced in each such polymerization stage or set of reaction conditions in one reaction stage or in one polymerization reactor is herewith denominated as "fraction of the first copolymer", namely "first fraction of the first copolymer", "second fraction of the first copolymer, etc.

This split production mode leads to a more homogenous residence time of the particles of the first copolymer of ethylene and the first alpha-olefin comonomer when entering the GPR and hence more uniform properties of the particles produced in the second polymerization step, i.e. gas-phase-reactor, in view of viscosity and density.

These two properties, namely viscosity and density in combination, have then decisive influence on the final properties of the final multimodal copolymer of ethylene and any articles produced thereof.

Inventors also identified, that the more uniform properties of the particles produced in the first copolymerization step are further essential to achieve very low densities in the GPR in combination with low MFR of the second ethylene copolymer produced in the GPR.

So in a special embodiment the multimodal ethylene copolymer of the present invention comprises of a first and a second copolymer of ethylene as mentioned above, wherein the first copolymer of ethylene comprises at least a first and a second fraction of the first copolymer of ethylene and the first alpha-olefin comonomer.

These two or more fractions of the first copolymer of ethylene may be unimodal in view of their molecular weight and/or their density or they can be bimodal in respect of their molecular weight and/or their density.

It is preferred that the two or more fractions of the first copolymer are unimodal in view of their molecular weight and density.

This first and second fraction (and any further fraction) of the first copolymer of ethylene and the first alpha-olefin comonomer can be produced by any of the known process in the art.

However it is preferred, that both fractions are produced with the same technology, especially by applying the same method and polymerization settings as disclosed with the "first copolymer"-section above.

It is within the scope of the invention, that the first and the second fraction of the first copolymer of ethylene and the first alpha-olefin comonomer are present in a ratio of 4:1 up to 1:4, such as 3:1 to 1:3, or 2:1 to 1:2, or 1:1.

It is further preferred, that the two or more fractions of the first copolymer of ethylene and a first alpha-olefin-comonomer are produced in two or more consecutive reactors according to the same process and method as given further above under "First copolymer".

For a person skilled in the art it will be clear that—when producing the first and the second fraction of the first copolymer of ethylene and the first alpha-olefin comonomer in two consecutive reactors, there can (or even has to) be a certain difference in the $MFR_2$-values and density-values of each fraction, (and still) to be able to define them as "unimodal".

It is hence understood within the meaning of the invention, that—given the preferred MFR-range of 150 to 1500 g/10 min—both the $MFR_2$ after loop 1 and after loop2 of the first copolymer of ethylene are to be within the range of 150-1500 g/10 min.

Further, the $MFR_2$ after loop2 can be up to double or 1.5 times the $MFR_2$ after loop1 or can be the same, to be still understood as "unimodal in view of MFR".

Accordingly it is understood within the scope of the invention, that—at the density range in between 945 and 955 $kg/m^3$—the densities of the first and after the second (and after any further) fraction of the first copolymer may differ by at most. 3 $kg/m^3$ and still be understood as having been produced with the same process condition.

Example

| Loop density after | Loop density after Loop 2 | |
| --- | --- | --- |
| 950 | 953 | Same condition |
| 954 | 951 | Same condition |
| 955 | 950 | Different condition |

Second Copolymer

The second copolymer of ethylene comprises ethylene and a second alpha-olefin comonomer having 6 to 10 carbon atoms, such as 1-hexene or 1-octene, more preferably 1-hexene.

It is further preferred that the second alpha-olefin comonomer has more carbon atoms than the first alpha-olefin monomer.

It is further preferred that the second alpha-olefin comonomer has 2 more carbon atoms than the first alpha-olefin monomer.

In a preferred embodiment the second copolymer consists of ethylene and 1-hexene.

Without being bound to any theory the present inventors opine, that the use of alpha-olefin comonomers having 6 to 10 carbon atoms facilitates the creation of tie-molecules already at lower molecular weight than it would be possible with lower alpha-olefin comonomer such as 1-butene.

This easier formation of tie-molecules has significant benefits when it comes to mechanical properties, especially in the sense of impact behaviour, such as DDI.

The second copolymer is produced in the presence of any previously produced polymer component, i.e. in the presence of at least the first copolymer of ethylene and the first alpha-olefin comonomer, optionally any fractions of the first copolymer and the first alpha-olefin comonomer and any prepolymerization-components, forming the so-called "second copolymer mixture".

The melt flow rate of the second copolymer mixture corresponds to the MFR of the final product.

The $MFR_5$ is from 0.5 to 5.0 g/10 min, preferably from 0.8 to 4.0 g/10 min.

The second copolymer mixture preferably has $MFR_{21}$ of 10-200 g/10 min, preferably from 15-150 g/10 min, like 25-100 g/min, such as 28-80 g/10 min Furthermore, the second copolymer mixture can have a flow rate ratio $FRR_{21/5}$ of at least 15 or more, such as 20 or 23 or more.

Furthermore, it can have a flow rate ratio $FRR_{21/5}$ in the range of 15-40, preferably in the range of 20-35.

It is well understood for a person skilled that the density or viscosity ($MFR_{21}$) of the second copolymer as such cannot be measured because the second copolymer cannot be isolated out of the second copolymer mixture and from the first copolymer.

However, the $MFR_{21}$ of the second copolymer can be calculated by using the so called Hagström equation (Hagström, The Polymer Processing Society, Europe/Africa Region Meeting, Gothenburg, Sweden, Aug. 19-21, 1997).

Hagström formula            Equation 4

$$MI_b = \left( \omega \cdot MI_1^{\frac{w-b}{a}} + (1-w) \cdot MI_2^{\frac{w-b}{a}} \right)^{\frac{-a \cdot w^b}{}}$$

As proposed by Hagström, a=10.4 and b=0.5 for $MFR_{21}$. Further, unless other experimental information is available, $MFR_{21}/MFR_2$ for one polymer component (i.e. first copolymer or second copolymer) can be taken as 30. Furthermore, w is the weight fraction of the polymer component having higher MFR. The first copolymer can thus be taken as the component 1 and the second copolymer as the component 2. The $MFR_{21}$ of the second copolymer ($MI_2$) can then be solved from equation 1 when the $MFR_{21}$ of the first copolymer mixture ($MI_1$) and the second copolymer mixture ($MI_b$) are known.

Preferably the second copolymer of ethylene and a second alpha olefin comonomer has an $MFR_{21}$ of <20 g/10 min when calculated according to Equation 4: Hagström formula.

The content of the comonomer in the second copolymer is controlled to obtain the desired density of the second copolymer mixture. Typically the second copolymer mixture has a density of from 906 to 925 kg/m³, preferably 910 to 925 kg/m³, more preferably from 913 to 923 kg/m³.

The density of the second copolymer cannot be directly measured. However, by using the standard mixing rule of Equation 5 the density of the second copolymer can be calculated starting from the densities of the second copolymer mixture and the first copolymer. Then the subscripts b, 1 and 2 refer to the overall mixture b (=second copolymer mixture), component 1 (=first copolymer) and component 2 (=second copolymer), respectively.

Density mixing rule $$\rho_b = w_1 \cdot \rho_1 + w_2 \cdot \rho_2 \quad \text{Equation 5:}$$

Within the scope of the invention is advantageous, that the density of the second copolymer is lower than the density of the first copolymer.

The density of the second copolymer has major influence on the impact behaviour of the material and consecutively of the films produced thereof. Hence the density of the second copolymer influences the DDI of the films produced.

Still care has to be taken to choose a density range that both gives good impact behaviour but does not cause operability problems during polymerization due to stickiness.

It is preferred, that the density of the second copolymer is below 900 kg/m³, such as at most 898 kg/m³, or 897 kg/m³ or below, or 895 kg/m³ or below or 892 kg/m³ or below, or 890 kg/m³ or below when calculated according to Equation 5.

Further within the scope of the invention it is preferred, that the density of the second copolymer is at least 880 kg/m³, such as at least 883 kg/m³ or at least 885 kg/m³.

It is further preferable, that the density of the second copolymer is within the range of 880-<900.0 kg/m³, such as 885-898 kg/m³, such as 885-897 kg/m³.

The ratio (i.e. the split) between the first and the second copolymer within the final multimodal copolymer of ethylene and at least two alpha-olefin-comonomers has significant effect on the mechanical properties of the final composition.

It is hence envisaged within the scope of the invention that the second copolymer of ethylene and the second alpha-olefin comonomer forms a significant part of the polymer fractions present in the multimodal ethylene copolymer, i.e. at least 50 wt. % of the final composition, preferably 53 wt. % or more, such as 55 wt. % or more.

More preferably the second copolymer of ethylene and the second alpha-olefin comonomer may form about 60 wt. % or more, such as 65 wt. % or more of the multimodal copolymer of the present invention.

Consecutively the first copolymer of ethylene and the first alpha-olefin comonomer forms at most 50 wt. % or less of the multimodal ethylene copolymer of the current invention, preferably 47 wt. % or less, such as 45 wt. % or less. More preferably the first copolymer of ethylene and the first alpha-olefin comonomer may form about 40 wt. % or less, such as 35 wt. % or less of the multimodal copolymer of the present invention.

Prepolymerization

The polymerization steps discussed above may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step is conducted in slurry.

Thus, the prepolymerization step may be conducted in a loop reactor. The prepolymerization is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons.

The temperature in the prepolymerization step is typically from 0 to 90° C., preferably from 20 to 80° C. and more preferably from 55 to 75° C.

The pressure is not critical and is typically from 1 to 150 bar, preferably from 40 to 80 bar.

The amount of monomer is typically such that from about 0.1 to 1000 grams of monomer per one gram of solid catalyst component is polymerized in the prepolymerization step. As the person skilled in the art knows, the catalyst particles recovered from a continuous prepolymerization reactor do not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits.

However, the average amount of prepolymer on the catalyst typically is within the limits specified above.

The molecular weight of the prepolymer may be controlled by hydrogen as it is known in the art. Further, antistatic additive may be used to prevent the particles from adhering to each other or the walls of the reactor, as disclosed in WO-A-96/19503 and WO-A-96/32420.

The catalyst components are preferably all introduced to the prepolymerization step when a prepolymerization step is present. However, where the solid catalyst component and the cocatalyst can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is understood within the scope of the invention, that the amount or polymer produced in the prepolymerization lies within 1-5 wt. % in respect to the final multimodal copolymer.

Catalyst

The polymerization is conducted in the presence of an olefin polymerization catalyst. The catalyst may be any catalyst which is capable of producing the desired ethylene polymer.

Suitable catalysts are, among others, Ziegler-Natta catalysts based on a transition metal, such as titanium, zirconium and/or vanadium catalysts. Ziegler-Natta catalysts are useful as they can produce polymers within a wide range of molecular weight with a high productivity.

Ziegler-Natta—catalysts are preferred within the scope of the invention.

Suitable Ziegler-Natta catalysts preferably contain a magnesium compound, an aluminium compound and a titanium compound, optionally supported on a particulate support.

The particulate support can be an inorganic oxide support, such as silica, alumina, titania, silica-alumina and silica-titania. Preferably, the support is silica.

The average particle size of the silica support can be typically from 10 to 100 µm. However, it has turned out that special advantages can be obtained if the support has median particle size from 6 to 40 µm, preferably from 6 to 30 µm.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another group of suitable Ziegler-Natta catalysts contain a titanium compound together with a magnesium halide compound acting as a support. Thus, the catalyst contains a titanium compound on a magnesium dihalide, like magnesium dichloride. Such catalysts are disclosed, for instance, in WO-A-2005/118655 and EP-A-810235.

Still a further type of Ziegler-Natta catalysts are catalysts prepared by a method, wherein an emulsion is formed, wherein the active components form a dispersed, i.e. a discontinuous phase in the emulsion of at least two liquid phases. The dispersed phase, in the form of droplets, is solidified from the emulsion, wherein catalyst in the form of solid particles is formed. The principles of preparation of these types of catalysts are given in WO-A-2003/106510 of Borealis.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, tri-isobutylaluminium, tri-hexylaluminium and tri-n-octylaluminium. Furthermore they include alkylaluminium oxy-compounds, such as methylaluminiumoxane (MAO), hexaisobutylaluminiumoxane (HIBAO) and tetraisobutylaluminiumoxane (TIBAO). Also other aluminium alkyl compounds, such as isoprenylaluminium, may be used. Especially preferred activators are trialkylaluminiums, of which triethylaluminium, trimethylaluminium and tri-isobutylaluminium are particularly useful. The amount in which the activator is used depends on the specific catalyst and activator.

Typically triethylaluminium is used in such amount that the molar ratio of aluminium to the transition metal, like Al/Ti, is from 1 to 1000, preferably from 3 to 100 and in particular from about 5 to about 30 mol/mol.

Films

Films comprising the multimodal copolymer of ethylene and at least two alpha-olefin-comonomers according to the present invention can be produced with several known conversion techniques, such as extrusion via blown or cast film technology, wherein blown films are preferred.

Films according to the present invention may be subjected to post-treatment processes, e.g. surface modifications, lamination or orientation processes or the like.

Such orientation processes can be mono-axially (MDO) or bi-axially orientation, wherein mono-axial orientation is preferred.

The films according to the present invention typically have a thickness of 35 µm or below, such as 30 µm or below or 25 µm or below or 22 µm or below.

Preferred are films having a thickness of 10 µm or higher, such as 15 µm or higher, such as 18 µm or 20 µm or 22 µm or 25 µm or higher.

More preferred are films having a thickness of 10-35 µm, such as 15-35 µm or 18-32 µm or 20-30 µm.

Films according to the present invention may be mono- or multilayer films, comprising one or more layers, like two, three or five layers, even up to seven, up to 9 or up to 12 layers.

Multilayer films are preferred.

Further preferred are multilayer films with 3 or more layers, such as multilayer films with 5-7 layers.

In multilayer films comprising the multimodal copolymer of ethylene and at least two alpha-olefin-comonomers according to the present invention, the multimodal copolymer according to the present invention may be contained by at least one of the layers.

It is envisaged by the invention that the the multimodal copolymer according to the present invention is also comprised by more than one layer, like two or three layers of the multilayer film.

It may be also comprised by all layers of the multilayer film.

It is within the scope of the present invention, that a monolayer film may comprise 1-100 wt. % of the the multimodal copolymer according to the present invention.

It is also within the scope of the invention that such monolayer film can comprise 10-90 wt. %, such as 30-70 wt. %, or like 40-60 wt. % or 45-55 wt. % of the multimodal copolymer according to the present invention.

However, a monolayer film comprising 100% of the multimodal copolymer of the present invention is preferred.

It is further within the scope of the present invention, that each layer of a multilayer film independently from the others may comprise 1-100 wt. % of the the multimodal copolymer according to the present invention. It is preferred, that each layer independently from the others comprises 10-90 wt. %, such as 30-70 wt. %, or like 40-60 wt. % or 45-55 wt. % of the multimodal copolymer according to the present invention.

It is within the scope of the invention, that the films are characterized by a high $DDI_{20}$. i.e. a $DDI_{20}$ of at least 400 g or higher, such as 470 or 550 or higher, such as 650; 700; 750 g or above.

It is within the scope of the invention that the films are characterized by a high relative DDI (i.e. DDI/film-thickness), i.e. a relative DDI of 10 g/μm or above, such as 18 or 25 g/μm or above. It is especially preferred, that films of the present invention have a relative DDI of 30 g/μm or above, such as 34 or 37 g/μm or higher.

A special embodiment of the invention encompasses films which are characterized by a thickness of 35 μm or below and a relative DDI of at least 25 g/μm.

Further within the scope of the invention are films having a relative DDI of >=35 g/μm or higher, wherein the calculated GPR-density of the multimodal copolymer of ethylene and at least two alpha-olefin-comonomers comprised therein is 892 g/cm³ or below.

Within the scope of the invention are films which have a good tear resistance in transversal direction (TD tear), i.e. a TD-tear resistance of at least 240 N/mm, such as 270 N/mm or 300 N/mm or above.

Also within the scope of the invention are films which have a good tear resistance in machine direction (MD tear), i.e. a MD-tear resistance of at least 40 N/mm, such as 55 N/mm or 65 N/mm or above.

It is within the scope of the invention that the films are characterized by a pronounced relative Isotropy (100*MD Tear/TD tear) in the range of at least 15%, such as at least 20% or higher, such as at least 25% or higher, such as at least 30% or higher.

It is within the scope of the invention that the films are characterized by a E-Modulus of at least 100 MPa, preferably at least 150 MPa.

Further encompassed by the invention are films having a $DDI_{20}$ of at least 400 g or above and any of
a relative Isotropy of at least 15% or above or
an E-Modulus of at least 100 MPa or above or
MD-tear resistance of at least 40 MPa or above or
a TD-tear resistance of at least 240 MPa or above.
a flow rate ratio $FRR_{21/5}$ of at least 15

Further encompassed by the invention are films having a $DDI_{20}$ of at least 400 g or above and any two properties of
a relative Isotropy of at least 15% or above or
an E-Modulus of at least 100 MPa or above or
MD-tear resistance of at least 40 MPa or above or
a TD-tear resistance of at least 240 MPa or above
a flow rate ratio $FRR_{21/5}$ of at least 15

Alternatively encompassed by the invention are films having a relative DDI of at least 10 g/μm and any of
a relative Isotropy of at least 15% or above or
an E-Modulus of at least 100 MPa or above or
MD-tear resistance of at least 40 MPa or above or
a TD-tear resistance of at least 240 MPa or above.
a flow rate ratio $FRR_{21/5}$ of at least 15

Alternatively encompassed by the invention are films having a relative DDI of at least 10 g/μm and any two properties comprising
a relative Isotropy of at least 15% or above or
an E-Modulus of at least 100 MPa or above or
MD-tear resistance of at least 40 MPa or above or
a TD-tear resistance of at least 240 MPa or above
a flow rate ratio $FRR_{21/5}$ of at least 15

Alternatively encompassed by the invention are films characterized by having a relative Isotropy (100*MDtear/TDtear) of 15% or more and any of
a $DDI_{20}$ of at least 400 g or above or
a relative DDI of 10 g/μm or above
an E-Modulus of at least 100 MPa or above or
MD-tear resistance of at least 40 MPa or above or
a TD-tear resistance of at least 240 MPa or above
a flow rate ratio $FRR_{21/5}$ of at least 15

Alternatively encompassed by the invention are films characterized by having a relative Isotropy (100*MDtear/TDtear) of 15% or more and any two of
a $DDI_{20}$ of at least 400 g or above or
a relative DDI of 10 g/μm or above
an E-Modulus of at least 100 MPa or above or
MD-tear resistance of at least 40 MPa or above or
a TD-tear resistance of at least 240 MPa or above
a flow rate ratio $FRR_{21/5}$ of at least 15

Films according to the present invention may be mono- or multilayer films, comprising one or more layers, like two, three or five layers, even up to seven, up to 9 or up to 12 layers, as already stated above.

The films according to the present invention are highly useful to being used in various packaging applications, wherein applications related to food packaging are preferred.

Films comprising the multimodal copolymer of the current invention comprise shrink films, collation shrink films, wrap films, lamination films, etc.

Packaging articles comprising the multimodal copolymer of the current invention comprise bags, pouches, wrapping or collation films, and the like.

It is within the scope of the present invention that the multimodal copolymer of ethylene and two copolymers may comprise additives as used in the art, such as phenolic stabilizers, antioxidants, slip and antistatic agents, antiblock agents processing aids, colorants and the like.

EXAMPLES

Measuring Methods
Unless otherwise stated all analyses were conducted from stabilized pellet samples.

Melt Flow Rate

Melt flow rate (MFR) was determined according to ISO 1133 at 190° C. The load under which the measurement is conducted is given as a subscript. Thus, the MFR under the load of 2.16 kg is denoted as $MFR_2$. The melt flow rate $MFR_{21}$ is correspondingly determined at 190° C. under a load of 21.6 kg and $MFR_5$ under a load of 5 kg.

The melt index MFR is herein assumed to follow the mixing rule given in Equation 4 (Hagström formula):

$$MI_b = \left(\omega \cdot MI_1^{-\frac{w-b}{a}} + (1-w) \cdot MI_2^{-\frac{w-b}{a}}\right)^{-a \cdot w^b}$$

As proposed by Hagström, a=10.4 and b=0.5 for $MFR_{21}$. Further, unless other experimental information is available, $MFR_{21}/MFR_2$ for one polymer component (i.e first copolymer or second copolymer) can be taken as 30. Furthermore, w is the weight fraction of the polymer component having higher MFR. The first copolymer can thus be taken as the component 1 and the second copolymer as the component 2. The $MFR_{21}$ of the second copolymer ($MI_2$) can then be solved from equation 1 when the $MFR_{21}$ of the first copolymer mixture ($MI_1$) and the second copolymer mixture ($MI_b$) are known.

It is herewith stated, that the following expressions are to be understood as defined:

"$MFR_2$ loop1" is understood as the MFR of the polymer available after the first loop, comprising the "first fraction of the first copolymer" and optionally any polymer fraction produced in the prepolymerization-step (if any).

"Density Loop1" is understood as the density of the polymer available after the first loop, comprising the first fraction of the first copolymer and optionally any polymer fraction produced in the prepolymerization-step (if any).

"$MFR_2$ loop2" or "$MFR_2$ after loop2" is understood as the MFR of the polymer available after the second loop, i.e. comprising the first fraction of the first copolymer and the second fraction of the first copolymer and optionally polymer produced in any prepolymerization-step (if any).

The $MFR_2$ of the polymer fraction produced in the second loop (i.e. the second fraction of the first copolymer) is to be calculated according to Equation 4: Hagström formula and denominates as "$MFR_2$ of the second loop", i.e. the $MFR_2$ of second fraction of the first copolymer.

MFR mixing rule log MFR2(loop)=$n$*log MFI(split1)+(1−$n$)*log MFR(split2)　　　　　　　　Equation 6:

"Loop density after Loop2" (or "Density Loop2) is understood as the density of the polymer available after the second loop, i.e. comprising the first fraction of the first copolymer and the second fraction of the first copolymer and optionally polymer produced in any prepolymerization-step (if any).

The density of the polymer fraction produced in the second loop (i.e. the density of the second fraction of the first copolymer) is to be calculated according to Density mixing rule $\rho_b = w_1 \cdot \rho_1 + w_2 \cdot \rho_2$　　　　　　　　Equation 5:

"Final MFR21" is understood as the MFR of the polymer available after the gas phase reactor (GPR), i.e. comprising all the polymer fractions produced in any preceeding polymerization step, i.e. comprising the first fraction and the second fraction of the first copolymer, the high-molecular-weight fraction produced in the GPR and optionally polymer produced in any prepolymerization-step (if any).

"GPR $MFR_2$" denominates the MFR of the polymer fraction produced in the GPR and is to be calculated according to Equation 4:

$$MI_b = \left(\omega \cdot MI_1^{-\frac{w-b}{a}} + (1-w) \cdot MI_2^{-\frac{w-b}{a}}\right)^{-a \cdot w^b}$$

Density

Density of the polymer was measured according to ISO 1183-1:2004 Method A on compression moulded specimen prepared according to EN ISO 1872-2 (February 2007) and is given in kg/m³. The density is herein assumed to follow the mixing rule as given in Equation 5: Density mixing rule $\rho_b = w_1 \cdot \rho_1 + w_2 \cdot \rho_2$ Herein ρ is the density in kg/m³, w is the weight fraction of the component in the mixture and subscripts b, 1 and 2 refer to the overall mixture b, component 1 and component 2, respectively. "Density of GPR (calc)" has been calculated according to Equation 5 accordingly.

Both $\rho_1$ and $\rho_2$ are determined according to ISO 1183.

Dart Drop Strength (DDI)

Dart-drop is measured using ASTM D1709, method A (Alternative Testing Technique) from the film samples. A dart with a 38 mm diameter hemispherical head is dropped from a height of 0.66 m onto a film clamped over a hole. Successive sets of twenty specimens are tested. One weight is used for each set and the weight is increased (or decreased) from set to set by uniform increments. The weight resulting in failure of 50% of the specimens is calculated and reported.

$DDI_{20}$ denominates the Dart Drop Impact determined on a 20 µm blown film.

Tensile Modulus on Films

Tensile moduli in machine direction were determined acc. to ISO 527-3 on films with a thickness of 20 µm at a cross head speed of 1 mm/min Tear Resistance (Determined as Elmendorf Tear (N) in Machine (MD) and Transverse (TD) Direction:

The tear strength is measured using the ISO 6383/2 method. The force required to propagate tearing across a film sample is measured using a pendulum device. The pendulum swings under gravity through an arc, tearing the specimen from pre-cut slit. The specimen is fixed on one side by the pendulum and on the other side by a stationary clamp. The tear resistance is the force required to tear the specimen. The relative tear resistance (N/mm) is then calculated by dividing the tear resistance by the thickness of the film.

Relative Isotropy expresses the balanced tear resistance properties in machine and transversal direction. Relative Isotropy [%] is calculated by 100*(MD tear/TD tear)

Comonomer Determination (NMR Spectroscopy)

Quantitative nuclear-magnetic resonance (NMR) spectroscopy was used to quantify the comonomer content of the polymer.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification.{[1], [2], [6]} Standard single-pulse excitation was employed utilising the transient NOE at short recycle delays of 3 s {[1], [3]} and the RS-HEPT decoupling scheme {[4], [5]}. A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm {[9]}.

Characteristic signals corresponding to the incorporation of 1-hexene were observed {[9]} and all contents calculated with respect to all other monomers present in the polymer.

$$H=I_{*B4}$$

With no other signals indicative of other comonomer sequences, i.e. consecutive comonomer incorporation, observed the total 1-hexene comonomer content was calculated based solely on the amount of isolated 1-hexene sequences:

$$H_{total}=H$$

Characteristic signals resulting from saturated end-groups were observed. The content of such saturated end-groups was quantified using the average of the integral of the signals at 22.84 and 32.23 ppm assigned to the 2 s and 2 s sites respectively:

$$S=(1/2)*(I_{2S}+I_{3S})$$

The relative content of ethylene was quantified using the integral of the bulk methylene (δ+) signals at 30.00 ppm:

$$E=(1/2)*I_{\delta+}$$

The total ethylene comonomer content was calculated based the bulk methylene signals and accounting for ethylene units present in other observed comonomer sequences or end-groups:

$$E_{total}=E+(5/2)*B+(3/2)*S$$

The total mole fraction of 1-hexene in the polymer was then calculated as:

$$fH=(H_{total}/(E_{total}+H_{total})$$

The total comonomer incorporation of 1-hexene in mole percent was calculated from the mole fraction in the usual manner:

$$H[mol\%]=100*fH$$

The total comonomer incorporation of 1-hexene in weight percent was calculated from the mole fraction in the standard manner:

$$H[wt\%]=100*(fH*84.16)/((fH*84.16)+((1-fH)*28.05))$$

[1] Klimke, K., Parkinson, M., Piel, C., Kaminsky, W., Spiess, H. W., Wilhelm, M., Macromol. Chem. Phys. 2006; 207:382.

[2] Parkinson, M., Klimke, K., Spiess, H. W., Wilhelm, M., Macromol. Chem. Phys. 2007; 208:2128.

[3] Pollard, M., Klimke, K., Graf, R., Spiess, H. W., Wilhelm, M., Sperber, O., Piel, C., Kaminsky, W., Macromolecules 2004; 37:813.

[4] Filip, X., Tripon, C., Filip, C., J. Mag. Resn. 2005, 176, 239

[5] Griffin, J. M., Tripon, C., Samoson, A., Filip, C., and Brown, S. P., Mag. Res. in Chem. 2007 45, S1, S198

[6] Castignolles, P., Graf, R., Parkinson, M., Wilhelm, M., Gaborieau, M., Polymer 50 (2009) 2373

[7] Zhou, Z., Kuemmerle, R., Qiu, X., Redwine, D., Cong, R., Taha, A., Baugh, D. Winniford, B., J. Mag. Reson. 187 (2007) 225

[8] Busico, V., Carbonniere, P., Cipullo, R., Pellecchia, R., Severn, J., Talarico, G., Macromol. Rapid Commun. 2007, 28, 1128

[9] J. Randall, Macromol. Sci., Rev. Macromol. Chem. Phys. 1989, C29, 201.

Draw Down Ratio (DDR): Speed of the haul off/Speed of the extruder (represents MD orientation)

Blow Up Ratio (BUR): Diameter of the bubble/Diameter of the die (represents TD orientation)

Material Description:
Catalyst Preparation
Complex Preparation:

87 kg of toluene was added into the reactor. Then 45.5 kg Bomag A (Butyloctyl magnesium) in heptane was also added in the reactor. 161 kg 99.8% 2-ethyl-1-hexanol was then introduced into the reactor at a flow rate of 24-40 kg/h. The molar ratio between BOMAG-A and 2-ethyl-1-hexanol was 1:1.83.

Solid Catalyst Component Preparation:

275 kg silica (ES747JR of Crossfield, having average particle size of 20 μm) activated at 600° C. in nitrogen was charged into a catalyst preparation reactor. Then, 411 kg 20% EADC (2.0 mmol/g silica) diluted in 555 litres pentane was added into the reactor at ambient temperature during one hour. The temperature was then increased to 35° C. while stirring the treated silica for one hour. The silica was dried at 50° C. for 8.5 hours. Then 655 kg of the complex prepared as described above (2 mmol Mg/g silica) was added at 23° C. during ten minutes. 86 kg pentane was added into the reactor at 22° C. during ten minutes. The slurry was stirred for 8 hours at 50° C. Finally, 52 kg $TiCl_4$ was added during 0.5 hours at 45° C. The slurry was stirred at 40° C. for five hours. The catalyst was then dried by purging with nitrogen.

Polymerization:

Inventive Examples IE1-IE6, and

Comparative Examples CE1, CE2, CE4 and CE5

A loop reactor having a volume of 50 $dm^3$ was operated at a temperature of 70° C. and a pressure of 63 bar. Into the reactor were ethylene, 1-butene, propane diluent and hydrogen so that the feed rate of ethylene was 2.0 kg/h, hydrogen was 5.0 g/h, 1-butene was 80 g/h and propane was 50 kg/h. Also 11 g/h of a solid polymerization catalyst component produced as described above was introduced into the reactor together with triethylaluminium cocatalyst so that the molar ratio of Al/Ti was about 15. The production rate was 1.9 kg/h.

A stream of slurry was continuously withdrawn and directed to a loop reactor having a volume of 150 $dm^3$ and which was operated at a temperature of 85° C. and a pressure of 61 bar. Into the reactor were further fed additional ethylene, propane diluent, 1-butene comonomer and hydrogen so that the ethylene concentration in the fluid mixture was 2.9-5.1% by mole, the hydrogen to ethylene ratio was 250-1000 mol/kmol, the 1-butene to ethylene ratio was 300-3300 mol/kmol and the fresh propane feed was 41 kg/h. The production rate was 7-21 kg/h.

A stream of slurry from the reactor was withdrawn intermittently and directed into a loop reactor having a volume of 350 dm$^3$ and which was operated at 85° C. temperature and 54 bar pressure. Into the reactor was further added fresh propane feed of 69 kg/h and ethylene, 1-butene and hydrogen so that the ethylene content in the reaction mixture was 1.9-4.7 mol %, the molar ratio of 1-butene to ethylene was 520-1260 mol/kmol and the molar ratio of hydrogen to ethylene was 230-500 mol/kmol. The production rate was 13-26 kg/h.

The slurry was withdrawn from the loop reactor intermittently by using settling legs and directed to a flash vessel operated at a temperature of 50° C. and a pressure of 3 bar. From there the polymer was directed to a fluidized bed gas phase reactor operated at a pressure of 20 bar and a temperature of 80° C. Additional ethylene, 1-hexene comonomer, nitrogen as inert gas and hydrogen were added so that the ethylene content in the reaction mixture was 13-25 mol-%, the ratio of hydrogen to ethylene was 4-33 mol/kmol and the molar ratio of 1-hexene to ethylene was 7-370 mol/kmol. The polymer production rate in the gas phase reactor was 43-68 kg/h and thus the total polymer withdrawal rate from the gas phase reactor was about 115 kg/h.

The polymer powder was mixed under nitrogen atmosphere with 500 ppm of Ca-stearate and 1200 ppm of Irganox B225. Then it was compounded and extruded under nitrogen atmosphere to pellets by using a CIMP90 extruder so that the SEI was 230 kWh/ton and the melt temperature 260° C.

Polymerization

Comparative Example CE3 and CE6

A loop reactor having a volume of 50 dm$^3$ was operated at a temperature of 70° C. and a pressure of 63 bar. Into the reactor were ethylene, propane diluent and hydrogen so that the feed rate of ethylene was 2.0 kg/h, hydrogen was 4.7 g/h, 1-butene was 80 g/h and propane was 47 kg/h. Also 8.9 g/h of a solid polymerization catalyst component produced as described above was introduced into the reactor together with triethylaluminium cocatalyst so that the cocatalyst feed rate was 3.7 g/h. The production rate was 1.9 kg/h.

A stream of slurry was continuously withdrawn and directed to a loop reactor having a volume of 500 dm$^3$ was operated at a temperature of 85° C. and a pressure of 59 bar. Into the reactor were ethylene, propane diluent, 1-butene and hydrogen so that the ethylene concentration in the fluid mixture was ca 4% by mole, the hydrogen to ethylene ratio was 285 mol/kmol, the molar ratio of 1-butene to ethylene was ca 500 mol/kmol and the propane feed was 40 kg/h. The ethylene copolymer withdrawn from the reactor had MFR$_2$ of 95 g/10 min and density of 956 kg/m$^3$. The production rate was 41.7 kg/h.

The slurry was withdrawn from the loop reactor intermittently by using settling legs and directed to a flash vessel operated at a temperature of 50° C. and a pressure of 3 bar. From there the polymer was directed to a gas phase reactor operated at a pressure of 20 bar and a temperature of 80-85° C. Additional ethylene, 1-butene and/or 1-hexene comonomer, nitrogen as inert gas and hydrogen were added so that the ethylene content in the reaction mixture was 13-21.2 mol-%, the ratio of hydrogen to ethylene was nearly 10 mol/kmol and the molar ratio of 1-butene to ethylene was nearly 180 mol/kmol. The polymer production rate in the gas phase reactor was nearly 58 kg/h. The production split (weight-% 1st stage component/weight-% 2nd stage component) was 42/58 (CE3) and 43/57 (CE6).

The polymer was mixed with 500 ppm of Ca-stearate and 1200 ppm of Irganox B225 under nitrogen atmosphere. Then it was compounded and extruded under nitrogen atmosphere to pellets by using a CIMP90 extruder so that the SEI was 190 kWh/ton and the melt temperature 240° C.

The detailed operation conditions in the loop reactor and the gas phase reactor are shown in Table 1 and Table 2 below. The polymer properties are indicated in Table 3 below.

TABLE 1

Polymerization conditions in slurry phase.

| | | 1$^{st}$ loop | | | | 2$^{nd}$ loop | | | |
|---|---|---|---|---|---|---|---|---|---|
| | Operation | C2 conc. mol-% | H2/C2 ratio mol/kmol | C4/C2 ratio mol/kmol | production rate kg/h | C2 conc. mol-% | H2/C2 ratio mol/kmol | C4/C2 ratio mol/kmol | production rate kg/h |
| IE1 | SL C6 | 4 | 350 | 375 | 16 | 3.1 | 400 | 850 | 26 |
| IE2 | SL C6 | 3.6 | 950 | 3250 | 7.4 | 1.9 | 500 | 1250 | 13 |
| IE3 | SL C6 | 4.9 | 275 | 311 | 14.8 | 4.1 | 300 | 600 | 15 |
| IE4 | SL C6 | 5.1 | 250 | 313 | 14.5 | 4.7 | 270 | 520 | 15 |
| IE5 | SL C6 | 4.8 | 290 | 328 | 14.8 | 4.5 | 300 | 550 | 15 |
| IE6 | SL C6 | 4.9 | 310 | 323 | 14.7 | 3.6 | 360 | 700 | 15 |
| CE1 | SL C6 | 5.1 | 290 | 400 | 12.9 | 4.7 | 260 | 600 | 21 |
| CE2 | SL C6 | 4.6 | 300 | 385 | 13.1 | 3.8 | 300 | 680 | 21 |
| CE3 | ML C4/6 | 4.3 | 290 | 500 | 41.7 | — | — | — | — |
| CE4 | SL C6 | 2.9 | 340 | 660 | 13.6 | 3.1 | 350 | 540 | 21 |
| CE5 | SL C6 | 5 | 335 | 400 | 20.5 | 4.4 | 230 | 610 | 19 |
| CE6 | ML C4/C6 | 3.8 | 280 | 500 | 41.7 | — | — | — | — |

TABLE 2

Polymerization conditions in gas phase.

| | Operation | C2 conc. mol-% | H2/C2 ratio mol/kmol | C4/C2 ratio mol/kmol | C6/C2 ratio mol/kmol | production rate kg/h | split (process calc.) wt-% |
|---|---|---|---|---|---|---|---|
| IE1 | SL C6 | 19 | 9 | 0 | 310 | 64 | 59 |
| IE2 | SL C6 | 17 | 9 | 0 | 190 | 43 | 64 |
| IE3 | SL C6 | 15.8 | 9.7 | 0 | 330 | 53 | 58.3 |
| IE4 | SL C6 | 16.5 | 5.2 | 0 | 300 | 50 | 58.1 |
| IE5 | SL C6 | 15.3 | 4.7 | 0 | 320 | 51 | 58.1 |
| IE6 | SL C6 | 13.3 | 6.2 | 0 | 30 | 51 | 57.6 |
| CE1 | SL C6 | 24.6 | 32.7 | 0 | 7.3 | 61 | 62.7 |
| CE2 | SL C6 | 21.2 | 14.6 | 0 | 250 | 70 | 66 |
| CE3 | ML C4/6 | 14 | 11 | 231 | 180 | 60 | 58 |
| CE4 | SL C6 | 20.8 | 12.2 | 0 | 365 | 67 | 64.9 |
| CE5 | SL C6 | 23.4 | 16.5 | 0 | 300 | 58 | 58.5 |
| CE6 | ML C4/6 | 13 | 9 | 107 | not avail. | 57 | 57 |

Operation:

ML indicates Mono-loop setting. i.e. the first copolymer of ethylene comprising a first alpha-olefin comonomer has been produced in one step.

SL indicates Split loop setting. i.e. the first copolymer of ethylene comprising a first alpha-olefin comonomer has been produced in two consecutive stages, so comprising a first and a second fraction of the first copolymer.

C6 indicates that the second copolymer of ethylene comprises 1-hexene as second alpha-olefin comonomer C4/6 indicates that the second copolymer of ethylene comprises both 1 butene and 1-hexene as second alpha-olefin comonomers The polymers in table 3 were converted into 20 μm films on a Collin monolayer film extruder applying a draw down ratio (DDR) of 30 draw down ratio (DDR) was calculated according to Equation 1.

Machine-settings: L/D ratio: 30; die gap: 1.5 mm, die diameter: 60, blow up ratio (BUR) 2.5; frost line height: 120 mm.

Temperature Profile:

| MFR$_5$ >1.2-2.0: | 80 | 160 | 180 | 180 | 180 | 180 | 180 | 180 | 180 | ° C. |
| MFR$_5$ >2.0-5.0: | 80 | 150 | 160 | 160 | 160 | 160 | 160 | 160 | 160 | ° C. |

TABLE 3

| | Loop1 | | Loop1 + loop2 | | | Pellets | | | | Calculated | | | | |
|---|---|---|---|---|---|---|---|---|---|---|---|---|---|---|
| | Loop1 MFR$_2$ kg/m$^3$ | Loop1 density kg/m$^3$ | Loop MFR$_2$ g/10' | Loop density kg/m$^3$ | split % | Final MFR$_{21}$ g/10' | Final MFR$_5$ g/10' | FRR | Final density kg/m$^3$ | GPR Split % | GPR density kg/m$^3$ | GPR MFR$_{21}$ g/10 min | DDI$_{20}$ g | Rel. DDI [g/μm] | E-Modulus (MD) MPa |
| IE1 | 368 | 948 | 530 | 949 | 15:24 | 53 | 2.0 | 26.5 | 914 | 59 | 888.6 | 5.39 | 892 | 44.6 | 177 |
| IE2 | 376 | 950 | 600 | 949 | 13:22 | 70 | 2.6 | 26.9 | 914 | 64 | 893.1 | 11.25 | 754 | 37.7 | — |
| IE3 | 240 | 949 | 280 | 951 | 16:23 | 76 | 3.1 | 24.6 | 917 | 58 | 892.3 | 9.66 | 610 | 30.5 | 188 |
| IE4 | 189 | 950 | 240 | 952 | 17:23 | 46 | 1.9 | 24.1 | 920 | 58 | 896.9 | 5.21 | 692 | 34.6 | 204 |
| IE5 | 206 | 952 | 350 | 953 | 17:23 | 57 | 2.3 | 24.9 | 917 | 58 | 891.4 | 6.28 | 852 | 42.6 | 185 |
| IE6 | 175 | 950 | 925 | 949 | 17:24 | 78 | 3.0 | 25.9 | 916 | 58 | 891.1 | 6.98 | 924 | 46.2 | 165 |
| CE1 | 361 | 946 | 30 | 950 | 13:22 | 39 | 2.1 | 18.4 | 924 | 63 | 908.1 | 5.71 | 113 | 5.7 | 258 |
| CE2 | 367 | 950 | 500 | 949 | 13:20 | 19 | 0.9 | 21.0 | 922 | 66 | 907.2 | 3.14 | 215 | 10.8 | 260 |
| CE3 | | | 360 | 950 | 40 | 160 | 7.2 | 22.5 | 913 | 58 | 886.4 | 22.28 | 157 | 7.9 | — |
| CE4 | 388 | 945 | 370 | 951 | 13:20 | 33 | 1.5 | 22.3 | 919 | 65 | 901.5 | 5.79 | 173 | 8.7 | — |
| CE5 | 312 | 951 | 200 | 952 | 27:19 | 26 | 1.1 | 23.5 | 928 | 59 | 910.5 | 2.73 | 121 | 6.1 | — |
| CE6 | | | 340 | 951 | 41 | 36 | 1.5 | 24.0 | 922 | 57 | 900 | 3.22 | | | — |

The polymers were converted into films on a Collin monolayer film extruder applying different Draw Down ratios.

Machine-settings: Screw diameter: 30 mm, L/D ratio: 30; die diameter: 50 mm; frost line height: 100 mm; die gap and BUR: as given in the table 4 below.

TABLE 4

Effect of different Draw Down ratios on the DDI

| Material | Melt Pressure Bar | Screw Speed rpm | Take Off Speed | Melt Temp | Die Gap mm | BUR 1: | Film Thickness μm | MD Tear N/mm | TD Tear [N/mm[ | Rel. Isotropy % | Dart Drop Impact g | Relative DDI g/μm | Draw Down Ratio |
|---|---|---|---|---|---|---|---|---|---|---|---|---|---|
| IE1 | 233 | 147 | 9.8 | 200 | 0.8 | 2.5 | 30 | 70 | 250 | 28.0 | 1232 | 41.1 | 10.7 |
| IE1 | 213 | 147 | 8.2 | 202 | 1.5 | 2.5 | 29.8 | 65 | 288 | 22.6 | 1210 | 40.3 | 20.0 |
| IE1 | 201 | 145 | 9.9 | 199 | 2 | 2.5 | 30 | 103 | 287 | 35.9 | 1076 | 35.9 | 26.7 |
| IE1 | 213 | 144 | 12.2 | 204 | 1.5 | 2.5 | 19.9 | 131 | 363 | 36.1 | 764 | 38.3 | 30.0 |
| IE1 | 199 | 141 | 14.7 | 200 | 2 | 2.5 | 19.9 | 81 | 381 | 21.3 | 405 | 20.3 | 40.0 |
| IE3 | 219 | 145 | 9.8 | 195 | 0.8 | 2.5 | 30.2 | 82 | 268 | 30.6 | 870 | 29.0 | 10.7 |
| IE3 | 196 | 142 | 9.7 | 194 | 1.5 | 2.5 | 29.3 | 65 | 279 | 23.3 | 588 | 19.6 | 20.0 |
| IE3 | 186 | 139 | 9.7 | 194 | 2 | 2.5 | 29.7 | 59 | 303 | 19.5 | 439 | 14.6 | 26.7 |
| IE3 | 195 | 140 | 14.7 | 195 | 1.5 | 2.5 | 20.2 | 122 | 381 | 32.0 | 550 | 27.5 | 30.0 |
| IE3 | 187 | 141 | 14.7 | 194 | 2 | 2.5 | 19.4 | 125 | 370 | 33.8 | 233 | 11.7 | 40.0 |
| CE6 | 275 | 77 | 10 | 192 | 1 | 3 | 29 | 36 | 326 | 11.0 | 281 | 9.7 | 11.5 |
| CE6 | 243 | 76 | 10 | 193 | 2 | 3 | 29 | 31 | 374 | 8.3 | 182 | 6.3 | 23.0 |
| CE6 | 237 | 77 | 10 | 193 | 2 | 3 | 29 | 17 | 447 | 3.8 | 178 | 6.1 | 23.0 |
| CE6 | 278 | 78 | 15 | 193 | 1 | 3 | 19 | 40 | 428 | 9.3 | 138 | 6.9 | 16.7 |
| CE6 | 245 | 76 | 15 | 193 | 2 | 3 | 21 | 10 | 541 | 1.8 | 92 | 4.6 | 33.3 |
| CE6 | 236 | 77 | 15 | 193 | 2 | 3 | 19 | 8 | 459 | 1.7 | 78 | 3.9 | 33.3 |

Figure 1:
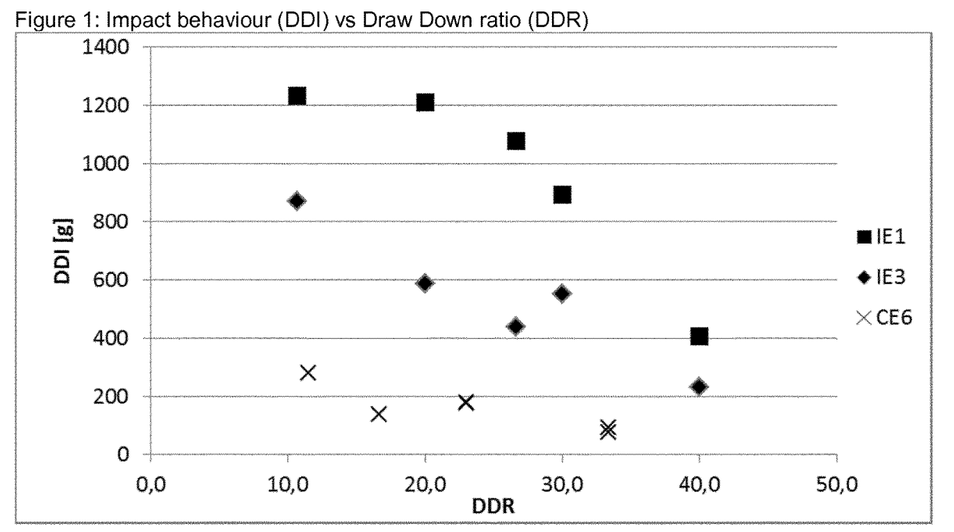
FIG. 1 shows that the inventive examples have higher DDI at a given Draw down ratio.

FIG. 1 clearly shows, that the inventive examples have higher DDI at a given Draw down ratio. FIG. 1 also indicates that much higher draw down ratio (DDR) can be applied, still resulting in films with good mechanical properties, especially DDI. This further indicates that processability and drawability of the polymer are clearly improved.

Figure 2:
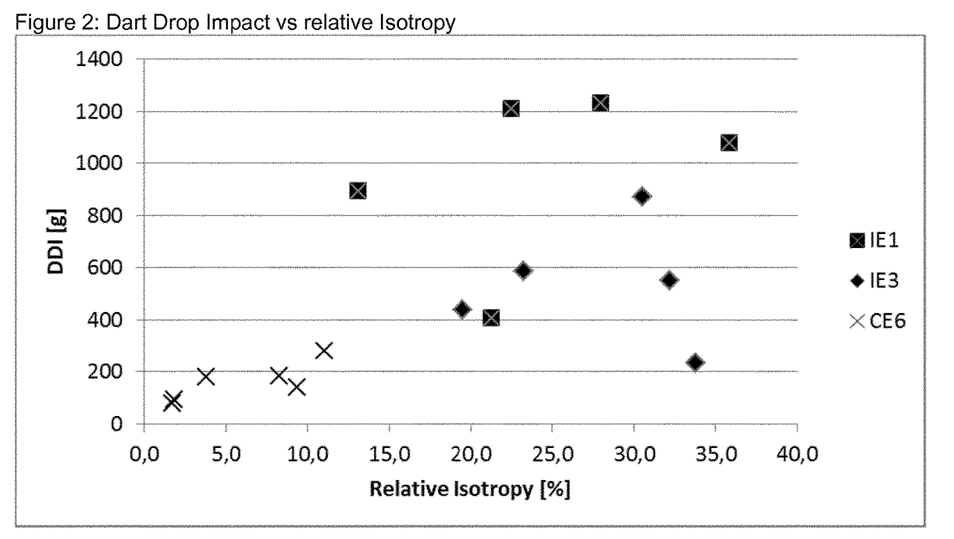
FIG. 2 shows that the inventive examples have much better DDI or increased impact together with an improved Isotropy of the films.

FIG. 2 clearly shows, that the inventive examples have much better DDI or increased impact together with an improved Isotropy of the films.

Figure 3:
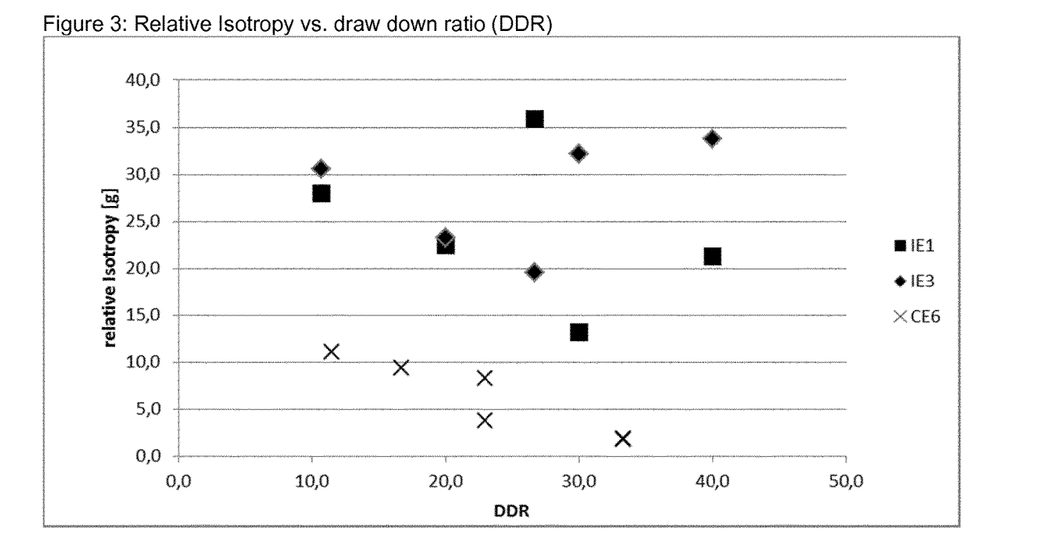
FIG. 3 shows that the inventive examples have also much better Isotropy at a given Draw dawn ratio.

FIG. 3 clearly shows that the inventive examples have also much better Isotropy at a given Draw dawn ratio.

FIG. 3 also indicates that much higher DDR can be applied, still resulting in films with good mechanical properties, especially isotropy. This further indicates that processability and draw ability of the polymer are clearly improved.

The invention claimed is:

1. A multimodal polymer composition said polymer composition having
   a) a density of from 906 to 925 kg/m³ determined according to ISO 1183,
   b) an $MFR_{21}$ of 10-200 g/10 min determined according to ISO 1133,
   wherein the multimodal polymer composition comprises
   c) 35 wt % to 50 wt % of a first copolymer comprising
      i) a prepolymerisation fraction
      ii) a first fraction comprising a copolymer of ethylene and a first alpha-olefin comonomer having 4 to 10 carbon atoms and
      iii) a second fraction comprising a copolymer of ethylene and a first alpha-olefin comonomer having 4 to 10 carbon atoms
      wherein the first copolymer has a higher $MFR_2$ than the $MFR_2$ of the prepolymerisation fraction and first fraction combined, and wherein the weight ratio of the first fraction to second fraction is 2:1 to 1:2; and
      wherein the prepolymerisation fraction is from 1 to 5 wt % of the multimodal polymer composition, the first fraction is at least 13 wt % of the multimodal polymer composition, and the second fraction is at least 13 wt % of the multimodal polymer composition;
   d) 50 wt % to 65 wt % of a second copolymer of ethylene
      i) comprising a second alpha-olefin comonomer having 6 to 10 carbon atoms, and having a density of below 900 kg/m³ when calculated according to Equation 5:

$$\rho_b = w_1 \cdot \rho_1 + w_2 \cdot \rho_2$$

wherein $\rho_b$, $\rho_1$ and $\rho_2$ refer respectively to the densities of the overall mixture b, first copolymer and second copolymer, based on values determined according to ISO 1183; and wherein $w_1$ and $w_2$ refer respectively to the weight fractions of the first and second copolymers; wherein the copolymers of said multimodal polymer composition comprise at least two alpha-olefin-comonomers in total.

2. A multimodal composition as claimed in claim 1 wherein the first copolymer mixture further comprises a prepolymerization fraction.

3. A multimodal polymer composition as claimed in claim 1 wherein the copolymer has a $DDI_{20}$ of 400 g or more when being converted into a film.

4. A multimodal polymer composition as claimed in claim 1 wherein the first alpha-olefin comonomer in the first and second fractions comprises 1-butene and the second alpha-olefin comonomer in the second copolymer comprises 1-hexene.

\* \* \* \* \*